US012650954B2

(12) United States Patent　　　　(10) Patent No.:　US 12,650,954 B2
Chuggani et al.　　　　　　　　　　(45) Date of Patent:　　　Jun. 9, 2026

(54) SYSTEM FOR DEDUPLICATION IN DATA STORAGE ENVIRONMENTS

(71) Applicant: NetApp, Inc., San Jose, CA (US)

(72) Inventors: Roopesh Chuggani, Jaipur (IN);
Dinakaran Narayanan, Chennai (IN);
Palak Sharma, Gurgaon (IN);
Mathankumar Devarajan, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 86 days.

(21) Appl. No.: 18/893,043

(22) Filed: Sep. 23, 2024

(65) Prior Publication Data

US 2026/0086982 A1　　Mar. 26, 2026

(51) Int. Cl.
*G06F 16/174*　　　(2019.01)
(52) U.S. Cl.
CPC ................................ *G06F 16/1748* (2019.01)
(58) Field of Classification Search
CPC .................................................. G06F 16/1748
See application file for complete search history.

(56) References Cited

U.S. PATENT DOCUMENTS

| | | | | |
|---|---|---|---|---|
| 7,747,584 B1 * | 6/2010 | Jernigan, IV | ....... | G06F 16/1748 |
| | | | | 711/112 |
| 8,583,893 B2 * | 11/2013 | Pruthi | ................... | G06F 3/0665 |
| | | | | 711/216 |
| 8,600,949 B2 * | 12/2013 | Periyagaram | ........... | G06F 3/067 |
| | | | | 707/664 |
| 8,793,290 B1 * | 7/2014 | Pruthi | ................... | G06F 3/0604 |
| | | | | 707/821 |
| 8,898,119 B2 * | 11/2014 | Sharma | ............... | G06F 16/1748 |
| | | | | 707/692 |
| 9,280,457 B2 * | 3/2016 | Goel | ...................... | G06F 3/0689 |
| 9,880,762 B1 * | 1/2018 | Armangau | .............. | G06F 3/067 |
| 10,521,400 B1 * | 12/2019 | Basov | ................. | G06F 16/1748 |
| 10,817,206 B2 * | 10/2020 | Soukhman | .............. | G06F 3/067 |
| 11,288,239 B2 * | 3/2022 | Bafna | ................... | G06F 16/128 |
| 11,947,497 B2 * | 4/2024 | Qiu | ...................... | G06F 16/1748 |
| 11,994,957 B1 * | 5/2024 | Lewis | ................. | G06F 11/3423 |
| 12,511,262 B1 * | 12/2025 | Shabi | ................. | G06F 16/1748 |
| 12,517,656 B2 * | 1/2026 | Subramanian | ........ | G06F 3/0611 |
| 2012/0005450 A1 * | 1/2012 | Bomma | ................. | G06F 3/0683 |
| | | | | 711/E12.001 |
| 2020/0019310 A1 * | 1/2020 | Faibish | ............... | H03M 7/3091 |
| 2022/0107916 A1 * | 4/2022 | Curtis-Maury | ....... | G06F 3/0643 |

(Continued)

*Primary Examiner* — Jorge A Casanova

(57)　　　　　　　ABSTRACT

Systems, methods, and software are disclosed herein for identifying duplicate blocks of a storage system and deduplicating the storage system. In one example, a method of operating a computing device includes scanning first metadata of blocks of a container file of a virtual volume to generate a first log file including records of virtual volume block numbers (VVBNs) and fingerprints of the blocks; scanning second metadata of blocks of an active file system of the virtual volume to generate a second log file including records of VVBNs and file block numbers (FBNs) of the blocks; generating tuples based on merging the records of the first log file and the second records of the second log file according to the VVBNs; identifying duplications among the blocks based on the tuples; and deduplicating the blocks based on the duplications in the active file system identified based on the tuples.

20 Claims, 9 Drawing Sheets

200

(56)  References Cited

U.S. PATENT DOCUMENTS

| | | | |
|---|---|---|---|
| 2022/0335027 A1* | 10/2022 | Subramanian Seshadri ................ | |
| | | | G06F 16/24573 |
| 2022/0405254 A1* | 12/2022 | Shatsky .............. | G06F 16/1748 |
| 2023/0244571 A1* | 8/2023 | Natanzon .............. | G06F 3/0644 |
| | | | 707/654 |
| 2024/0330127 A1* | 10/2024 | Lewis ................. | G06F 11/3409 |
| 2025/0124004 A1* | 4/2025 | Jernigan, IV ......... | G06F 3/0614 |

* cited by examiner

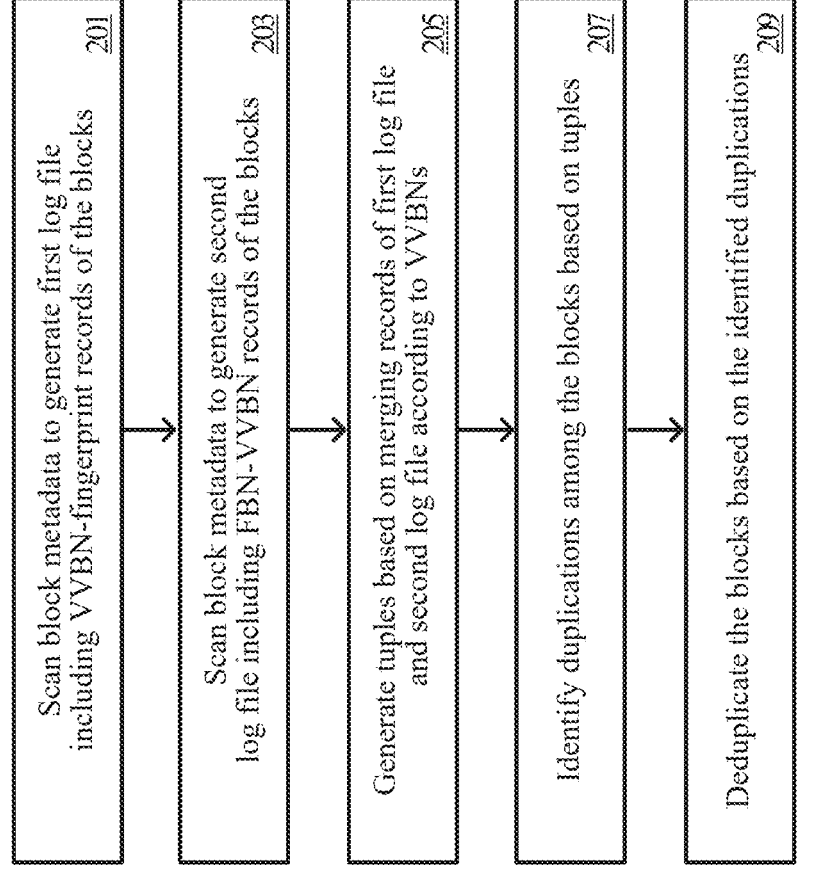

Scan block metadata to generate first log file including VVBN-fingerprint records of the blocks 201

Scan block metadata to generate second log file including FBN-VVBN records of the blocks 203

Generate tuples based on merging records of first log file and second log file according to VVBNs 205

Identify duplications among the blocks based on tuples 207

Deduplicate the blocks based on the identified duplications 209

COMPUTING SYSTEM 701

STORAGE SYSTEM 703

SOFTWARE 705

DEDUPLICATION PROCESS 706

COMM I/F SYSTEM 707

PROCESSING SYSTEM 702

USER I/F SYSTEM 709

SYSTEM FOR DEDUPLICATION IN DATA STORAGE ENVIRONMENTS

TECHNICAL FIELD

Aspects of the disclosure are related to the field of data storage and methods of improving storage efficiency including deduplication.

BACKGROUND

In the pursuit of storage efficiency in data storage environments, methods of deduplication, compression, and compaction are used to optimize the consumption of storage resources. Deduplication identifies and eliminates redundant copies of data, ensuring that only unique instances are stored, which significantly reduces the required storage capacity. Compression techniques further reduce the size of data by encoding it more efficiently, allowing more data to fit within the same storage space. Compaction reorganizes data blocks to minimize wasted space, ensuring that storage resources are used as effectively as possible. Together, these methods contribute to more efficient storage management, lowering costs and improving system performance.

A donor, in the context of data storage and deduplication, refers to the original or primary source of a data block that serves as the reference point for comparison against other data blocks. When deduplication processes are performed, new or incoming data is compared to existing data blocks (donors) to identify and eliminate redundancies. If the new data matches an existing donor block, instead of storing it again, the system references the donor, thereby saving storage space. The donor effectively acts as the master copy against which all other data blocks are checked for duplication.

Storage inefficiencies or losses occur when blocks are duplicated against different donors for the same data instead of against the same single donor. For example, if a system stores multiple versions of the same file from different donors without recognizing that they are identical, it may create unnecessary duplicates. Instead of linking these identical data blocks to a single donor, the system stores multiple copies, consuming additional storage space needlessly. This inefficiency can lead to increased storage costs and reduced overall system performance, as more space is taken up by redundant data rather than being optimized for unique content.

OVERVIEW

Technology is disclosed herein for identifying duplicate blocks of a storage system and deduplicating the storage system. In an implementation, a method of operating a computing device includes scanning first metadata of blocks of a container file of a virtual volume to generate a first log file including records of virtual volume block numbers (VVBNs) and fingerprints of the blocks; scanning second metadata of blocks of an active file system of the virtual volume to generate a second log file including records of VVBNs and file block numbers (FBNs) of the blocks; generating tuples based on merging the records of the first log file and the second records of the second log file according to the VVBNs; identifying duplications among the blocks based on the tuples; and deduplicating the blocks based on the duplications in the active file system identified based on the tuples.

In another example, a computing apparatus comprising one or more computer readable storage media, one or more processors operatively coupled with the one or more computer readable storage media, and program instructions stored on the one or more computer readable storage media that, when executed by the one or more processors, direct the computing apparatus to at least scan first metadata of blocks of a container file of a virtual volume to generate a first log file including records of virtual volume block numbers (VVBNs) and fingerprints of the blocks; scan second metadata of blocks of an active file system of the virtual volume to generate a second log file including records of VVBNs and file block numbers (FBNs) of the blocks; generate tuples based on merging the records of the first log file and the second records of the second log file according to the VVBNs; identify duplications among the blocks based on the tuples; and deduplicate the blocks based on the duplications in the file system identified based on the tuples.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates a process for deduplication of data storage in an implementation.

DETAILED DESCRIPTION

Figure 1:
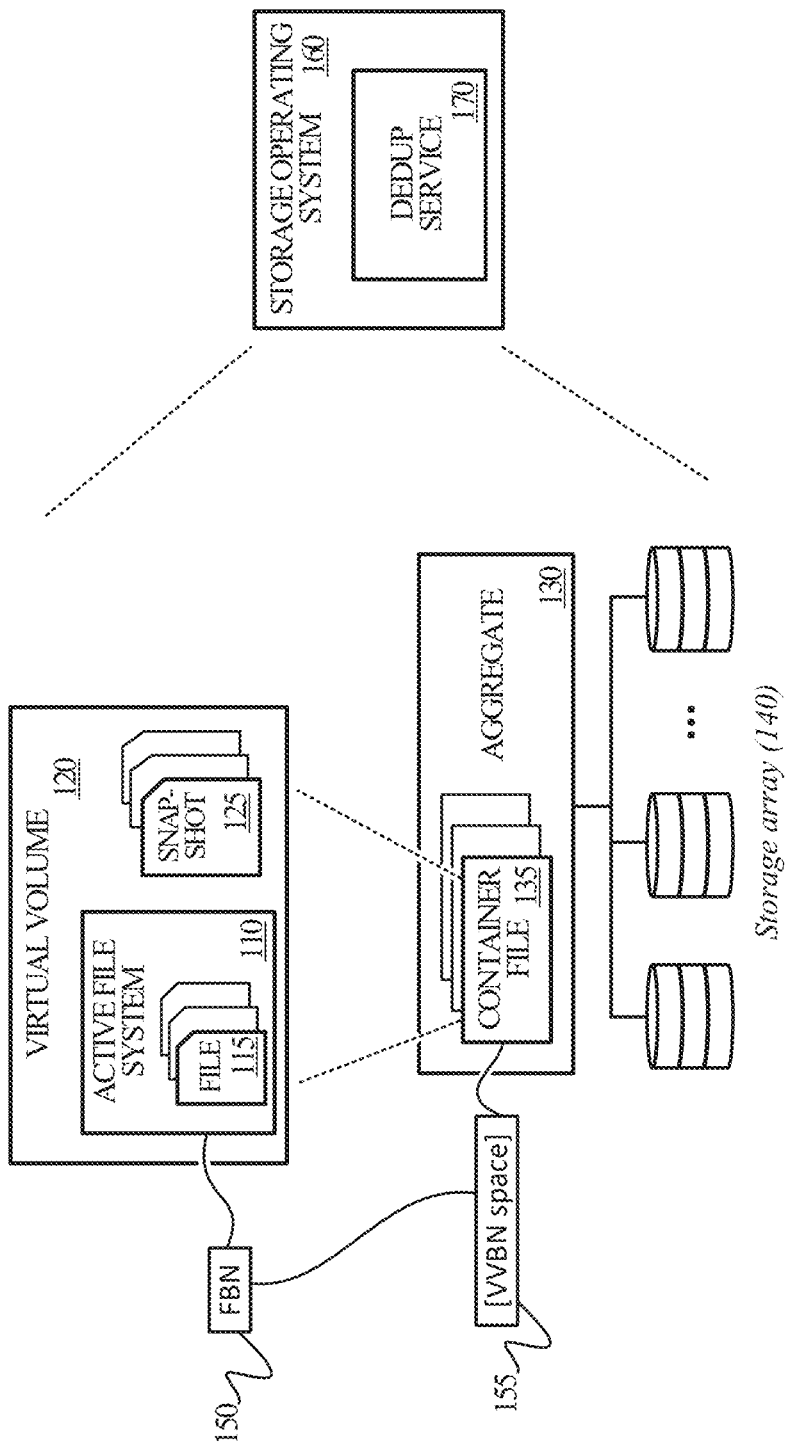
FIG. 1 illustrates a storage environment for deduplication of data storage in an implementation.

Various implementations are disclosed herein for a system for optimizing storage efficiency based on deduplicating blocks of data such as when data of an active file system is migrated to a new storage system. In various implementations, the system for deduplication improves storage efficiency by deduplicating not only data blocks associated with the active file system, but also the blocks associated with snapshots of active file system data. As a further advantage, the system relies on scanning the metadata of the data blocks, reading the block data (e.g., file data) only in certain circumstances. Thus, the system for deduplication disclosed herein is not only more efficient but results in improvements in performance overhead and IO overhead as compared to existing methods based on compression followed by deduplication.

In an implementation, when an active file system is migrated, for example, to a new architecture, a deduplication procedure is executed to identify duplicate data blocks of the active file system. To execute the deduplication procedure, two scans are performed in parallel. First, the metadata of the container files of the virtual volume instantiating the active file system are scanned to generate a log file which maps the block fingerprints of the data blocks to the virtual volume block numbers (VVBNs) of the blocks. Block fingerprints are identifiers computed based on the block content, such as a hash value, and so can be used to uniquely identify blocks and to identify duplicate block content. Second, metadata of the active file system is scanned to generate a second log file which maps the file block numbers (FBNs) and index node (inode) values of the data blocks to the VVBNs of the blocks. Thus, each record in the log files corresponds to a data block according to its VVBN.

Having generated the log files with records corresponding to each data block in the active file system by VVBN, the records of the log files are merged based on the VVBNs. By merging the records by VVBN, tuples are created for each block which include a fingerprint of the block, (where applicable) the file block number and inode value of the block, and the VVBN of the block. In an implementation, to merge the log files, an outer join is performed to ensure that any records which are not common to both log files are included in the output of the merge. For example, VVBNs corresponding to snapshots from the container files will not be mapped to FBN and inode values (as they will not be in the active file system), yet the system retains these records for inclusion in the deduplication process.

With tuples created for the data blocks, the tuples are sorted by fingerprint so that all the tuples with a particular fingerprint are aggregated. The aggregated tuples are also ordered according to type and then within each type according to FBN (for blocks associated with the active file system) or VVBN (for blocks associated with snapshots which do not have a mapping to an FBN or inode).

With the tuples sorted and ordered, donor-recipient dependencies between pairs of tuples are identified, and dependency chains are created by which the blocks can be deduplicated. Based on the sorting and ordering, three types of block sharing or dependencies may occur: an active file system (AFS) block referencing another AFS block, a snapshot block referencing an AFS block, and a snapshot block referencing another snapshot block. The dependencies are sorted or prioritized based on the type of dependency, and the deduplication is executed by implementing virtual volume block sharing or cross-volume block sharing based on the dependency type.

In various implementations, to improve the efficiency of the deduplication process, the log file of the VVBN to fingerprint mapping is generated by obtaining existing fingerprints from an existing fingerprint database, such as a database created in a previous deduplication process. When a fingerprint for a given VVBN is not available, then the block data is read to calculate a fingerprint for it.

In various implementations, an active file system which may be deduplicated according to the technology disclosed herein includes blocks associated with the file system or with snapshots. As such, the donor-recipient relationship between a pair of data blocks may include an AFS block or a snapshot block pointing to or referencing an/another AFS block. For optimal storage efficiency, all copies of a particular block of data, whether an AFS block or a snapshot block, should reference a single data block, i.e., single storage location on a physical drive. In use, however, there may be multiple copies of the block, i.e., duplicate or redundant data blocks, in multiple storage locations. To deduplicate the data is to cause the file(s) and snapshot(s) which reference the various copies of the particular block of data to point to the same, single storage location so that the storage space of the duplicates can be released.

In various implementations of the technology disclosed herein, a storage system to be deduplicated (for example, in a post-migration context) includes an aggregate volume of one or more virtual or logical volumes, each of which instantiates an active file system. An active file system of a virtual volume is a file system to which data can be both written or read and which logically organizes the data of the associated volume in a hierarchical structure of directories, files, and blocks. Data blocks of the physical storage underlying the aggregate volume are associated with the files of a given active file system according to FBNs. Data blocks are also associated with a logical volume of the storage system via VVBNs. A given logical volume may be associated with a range of VVBN values; a container file of the virtual volume maps the data blocks to their respective VVBNs. Thus, multiple internal representations are available by which to access the data blocks of the underlying storage.

One example of an active file system of the technology disclosed herein is a Write Anywhere File Layout (WAFL®) file system available from NetApp, Inc., San Jose, California, which includes a file system which stores metadata including, for a given file, a buffer tree which is an internal representation of the blocks of the file and by which file data may be accessed. The buffer tree may include an inode file and a layer of indirect ($L_1$) blocks which include pointers to the data ($L_0$) blocks in physical storage.

In various implementations, a snapshot of an active file system includes a read-only static image of the file system database, including database metadata, at a particular point in time, providing a record of the data in the state that the database was in at the time the snapshot was created. Snapshots memorialize the state of an active file system at a given point in time, and a snapshot can be used to restore the active file system to the state corresponding to the snapshot. Snapshots share data blocks with the active file system and use references to the VVBNs of data blocks in the underlying storage.

Various embodiments of the present technology provide for a wide range of technical effects, advantages, and/or improvements to computing systems and components. For example, various embodiments may include one or more of the following technical effects, advantages, and/or improvements: 1) unconventional and non-routine operations for deduplication; 2) dynamic integration of deduplication within a data migration workflow or other workflows; 3) automatically identifying duplicate blocks regardless of block type (e.g., AFS blocks, snapshot blocks); and/or 4) use of existing block fingerprint data to optimize identification of duplicate blocks. Some embodiments include additional technical effects, advantages, and/or improvements to computing systems and components.

Additional technical effects of the technology disclosed herein include improving storage efficiency by enabling the identification of duplicate snapshot blocks and the deduplication of snapshot blocks in addition to AFS blocks in a data storage system. As compared to existing methods, identifying duplicate snapshot blocks in addition to AFS blocks can effect a significant improvement in freeing up storage space. In addition, because both snapshot blocks and AFS blocks can be deduplicated, block sharing can be tailored to the type of dependency identified among the duplicate blocks. Further optimization is realized based on the fact that the deduplication methods disclosed herein are directed to identifying duplicate blocks based on looking at and comparing the block data (i.e., via block fingerprints), so the methods are independent of how the duplication of blocks occurred.

Further, because the process relies on scanning block metadata to identify blocks for deduplication, deduplication can be executed with reduced performance overhead and reduced IO overhead as compared to existing deduplication methods. Moreover, the technology disclosed herein is optimized by capturing existing fingerprints of data blocks (such as fingerprints generated from a previous deduplication operation), generating new block fingerprints only as necessary. Thus, the data blocks may be read at most once during deduplication according to the methods disclosed herein. In addition, deduplication can be performed prior to compression, there is no limitation of deduplicating adjacent data blocks as is the case with existing methods.

Turning now to the Figures, FIG. 1 illustrates storage environment 100 for a system for deduplication of an active file system in an implementation. Storage environment 100 includes active file system 110 including file 115, virtual volume 120, aggregate volume 130, container file 135, data storage 140, and data management system 160 including deduplication service 170.

Storage operating system 160 is representative of a system for managing a system for data storage including one or more storage devices. Storage operating system 160 functionally organizes the data storage system including executing storage operations such as deduplication service 170 in the context of a data storage service. The storage devices managed by storage operating system 160 may be physical drives such as solid-state drives (SSDs) or disk drives which are organized as a storage array, such as storage array 140. The storage of data on an array may be further organized as logical or virtual storage volumes according to container files. As illustrated, container file 135 of aggregate 130 includes every block of virtual volume 120 indexed according to VVBNs of VVBN space 155.

Aggregate 130 is representative of an active file system organizing a physical storage volume of the storage devices of a storage array, such as storage array 140. Aggregate 130 may be indexed by physical volume block numbers (PVBNs) corresponding to data blocks of storage array 140. As illustrated, aggregate 130 is apportioned into one or more virtual volumes, such as virtual volume 120, by means of container files such as container file 135. Container file 135 of aggregate 130 is representative of a file which defines a block address space for a virtual volume. As illustrated, container file 135 includes VVBN space 155 of virtual volume 120. Metadata of container file 135 (e.g., inode and buftree) map the VVBNs of virtual volume 120 to PVBNs of aggregate 130.

Virtual volume 120 is representative of a logical volume which is an implementation of an active file system. As illustrated, virtual volume 120 is defined by container file 135, a file in aggregate 130 that includes all the blocks used by virtual volume 120. Virtual volume 120 includes data blocks (i.e., $L_0$ blocks) as well as indirect blocks (i.e., $L_1$ blocks). Indirect blocks include pointers that point to other indirect blocks or to data blocks. Active file system 110 instantiated by virtual volume 120 may be a hierarchy of directories and files including file 115. File 115 is indexed by FBNs, and the metadata (e.g., inode and buftree) of file 115 maps the FBNs to VVBNs of virtual volume 120.

VVBN space 155 is representative of a subset or range of VVBN values of a virtual volume hosted by an aggregate volume. As illustrated in storage environment 100, VVBN space 155 is associated with virtual volume 120 of aggregate 130. A VVBN of VVBN space 155 maps to an FBN of file 115 according to metadata of file 115 and to a PVBN of aggregate 130 according to metadata of container file 135.

Snapshots 125 are representative of one or more point-in-time copies of the metadata of an active file system of a virtual volume of a storage environment. Taken at different times, snapshots such as snapshots 125 capture details on how data blocks are mapped to files, including FBNs, VVBNs, and PVBNs at the time of the snapshot was created. Snapshots can be used to reconstruct active file system 110 in the event of a storage system failure such as a drive failure or a malware attack.

From a bottom-up perspective of storage environment 100, the user data or file data of a given file, such as file 115, may be stored on a set of physical data blocks, e.g. 4k bytes of data per block of storage array 140. The physical data blocks are indexed by aggregate 130 as physical volume block numbers (PVBNs); the physical data blocks are also indexed according to virtual volume block numbers (VVBNs) of container files of aggregate 130 as block offsets within the container files. As illustrated in FIG. 1, container file 135 of aggregate 130 defines a block address space for virtual volume 120, and the metadata of container file 135 maps the VVBNs of VVBN space 155 of virtual volume 120 to PVBNs of aggregate 130. The VVBNs of virtual volume 120 are also mapped to FBNs of file 115 via metadata of file 115. In this way, storage operating system 160 can trace an FBN of file 115 to a VVBN of VVBN space 155 based on metadata of file 115 and then to a PVBN of aggregate 130 based on metadata of container file 135 to determine the physical data block of storage array 140 where the file data is stored.

In a brief operational scenario of storage environment 100, subsequent to migration of file data of virtual volume 120 to storage array 140, storage operating system 160 executes deduplication service 170 to identify and deduplicate redundant or duplicate data blocks of storage array 140 prior to compression. The operational scenario is described in reference to virtual volume 120 for ease of description, but it may be appreciated that the system is scalable to scenarios of multiple virtual volumes with no loss of generality.

To identify duplicate blocks, deduplication service 170 searches for block records with the same hash or fingerprint, indicating that the blocks are duplicates of each other. Deduplication service 170 generates block records of fingerprints by performing two scans of metadata in storage environment 100. In one scan, deduplication service 170 scans the metadata of container file 135 to generate a log file of records which map VVBNs of virtual volume 120 to fingerprints of data blocks of storage array 140. Because container file 135 includes active file system 110 as well as snapshots 125, the records generated in the scan may include active file system records as well as snapshot records. Deduplication service 170 also scans the metadata of active file system 110 to generate a log file of active file system records which map inode values and FBNs to VVBNs of virtual volume 120. Thus, the VVBNs of data blocks of virtual volume 120 are common to both log files generated by the scans.

Next, deduplication service 170 merges the log files according to the VVBNs. The merge produces block records or tuples for each data block of virtual volume 120 which include the VVBN of the block, the FBN and inode values (if any) of the block, and the block fingerprint. (For snapshot records which have neither an inode value nor FBN, a null value may be inserted in place of the inode value, and the VVBN may be substituted for an FBN value.) The tuples are then sorted by fingerprint so that the records of duplicate data blocks are aggregated. That is to say, when a block fingerprint is detected among multiple VVBNs (i.e., among multiple tuples), this is an indication that there is a duplication of a data block in storage array 140.

For a given fingerprint for which there are multiple VVBNs, the tuples are sorted by type, then ordered by index value. For example, the multiple tuples of a single fingerprint may be first sorted so that the active file system blocks are followed by snapshot blocks. The active file system blocks are then ordered by inode and FBN, while the snapshot blocks are ordered by VVBN. This multi-layer sorting is performed for all fingerprint values occurring more than once. To facilitate the multi-layer sorting, the tuples resulting from the merge may be "bucketed" according to ranges of fingerprints and the sorting performed within each bucket.

Having sorted and ordered the tuples, deduplication service 170 identifies dependency chains of donor and recipient dependencies. A dependency occurs between two adjacent records of the sorted and ordered tuples. Three types of dependency may occur: an AFS block depending from another AFS block; a snapshot block depending from an AFS block; and a snapshot block depending from a snapshot block. Because the tuples have been ordered by type, the dependencies of a given dependency chain will also be ordered according to dependency type.

Having identified duplicate blocks based on the dependency chains, deduplication service 170 can proceed with deduplicating the data blocks of storage array 140. To deduplicate the data blocks of a given dependency chain, deduplication service 170 updates the block metadata of recipient blocks to reference the first donor in the chain and frees up the data blocks of the secondary donors in storage array 140. Subsequent to deduplication, the data of storage array 140 can be compressed per the applicable storage policy.

FIG. 2 illustrates a method of deduplication in a storage environment in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity. In some scenarios, process 200 may be executed in the context of a storage system migration from a source storage system to a destination system, but deduplication according to process 200 may be performed to enable more efficient data storage in other (non-migratory) contexts as well.

The computing device scans the block metadata to generate a first log file including VVBN-fingerprint records of the blocks of the storage system (step 201). In an implementation, a storage system includes an aggregate volume with one or more container files defining logical or virtual volumes; each virtual volume instantiates an active file system and includes one or more snapshots of the file system. The container file of a virtual volume includes all the blocks, indexed by VVBN, associated with the virtual volume; each of the blocks is associated with the active file system of the virtual volume ("AFS block") or a snapshot of the active file system ("snapshot block").

To generate records of the VVBNs and block fingerprints, the computing device scans the metadata of the container file. The container files are indexed by the VVBNs of the data blocks of an underlying storage array of the storage system. Fingerprints of the data blocks may be generated by computing a hash of the block contents. To generate a VVBN-fingerprint record of a block, the computing device may consult a preexisting database of fingerprints previously generated, for example, from a previous deduplication. If a fingerprint does not exist for a data block, the computing device may read the block data and compute the fingerprint, then store the fingerprint in the database for future use. The computing device outputs a log file or metafile of records, including the VVBNs and the corresponding fingerprints of the blocks, which were captured or recorded during the scan.

The computing device scans block metadata to generate a second log file including FBN-VVBN records of the block of the storage system (step 203). In an implementation, the computing device determines whether the data on the data blocks of the storage system are compressed. If the data on a given data block has not been compressed, the computing device scans the metadata of the active file system associated with the block to capture a record of the block which maps the block VVBN to the FBN (or FBN and inode value) of the block. However, if the data on the block has been compressed, i.e., according to the format of the source storage system, the computing device performs an inline decompression, deduplication, compression, and compaction of the block data. The computing device then generates a record which maps the VVBN of the block to its inode value and FBN. It may be appreciated that the use of the terms "first" and "second" are labels for distinguishing the scans and output; steps 201 and 203 may be performed in a parallel or in either order.

The computing device generates tuples based on merging records of the first log file and records of the second log file according to the VVBNs (step 205). In an implementation, the computing device performs an outer join-type merge to generate tuples for each VVBN captured in the scans. Each tuple includes a fingerprint attribute, a VVBN attribute, an inode attribute, and an FBN attribute. For AFS blocks, each tuple is populated based on merging the records of corresponding VVBNs from the first and second log files. For snapshot blocks, each tuple is populated based on the VVBN and fingerprint of the first log file, while the inode attribute is nulled, and the VVBN is stored as the FBN attribute.

The computing device identifies duplications in the storage system based on the tuples (step 207). In an implementation, the output of the merging operation is sorted by fingerprint into buckets corresponding to ranges or subsets of fingerprint values. For each bucket of tuples, the computing device sorts the tuples by fingerprint so that all tuples of a given fingerprint are aggregated. Where there are multiple tuples corresponding to multiple VVBN values for a given fingerprint, the multiple VVBN values indicate the storage system is storing duplicate blocks.

The computing device deduplicates the storage system based on the identified duplications (step 209). In an implementation, the computing device determines based on the tuples which block to keep in storage ("first donor block") and which blocks may be freed up as duplicates. The computing device updates the block metadata (e.g., the container file metadata and AFS metadata) so that the multiple references to blocks of the same fingerprint point to the first donor block, and which of the other donor blocks may be dereferenced in the metadata.

In various implementations, to determine which block is to be the first donor block and which blocks are duplicates, the computing device sorts the tuples of a given fingerprint according to type and orders the tuples by index value or buftree position. For example, the tuples may be ordered according to a prioritization which orders active file system tuples before snapshot tuples. This creates a dependency chain of tuples for the given fingerprint with the first tuple in the order deemed the first donor block. Each consecutive pair of tuples in the chain forms a donor-recipient pair. Based on the prioritization, for each fingerprint, the pairs of tuples will be also ordered by sharing type (i.e., AFS pairs, then AFS-snapshot pair, then snapshot pairs).

To deduplicate the chain, the pairs are collapsed by pointing the recipients from each pair to the first donor block. For example, the second pair is collapsed and removed by pointing the recipient of the second pair to the first donor block. The third pair, referencing the now-removed second pair, is similarly collapsed and removed by pointing the recipient of the third pair to the first donor block. In this way, references to the duplicate donor blocks (below the first donor block in the chain) are zeroed out, and the active file system and container file metadata updated accordingly. By modifying the donor-recipient pairs to reference the first donor block, the duplicate blocks are made redundant and the storage locations of the duplicate blocks can be freed up for other uses.

Referring again to FIG. 1, storage environment 100 illustrates process 200 in an implementation with reference to elements of storage environment 100. For the sake of illustration it may be assumed that virtual volume 120 has been migrated to destination storage architecture of storage environment 100 and a deduplication is to be performed prior to compression. A computing device hosting storage operating system 160 and deduplication service 170 scans container file 135 by VVBNs of VVBN space 155 to generate a metafile which includes records of fingerprints for the data blocks of container file 135 by VVBN. The computing device also scans active file system 110 to generate a metafile which includes records of VVBNs by FBN and inode value.

The computing device merges the metafiles to generate output including tuples representative of the data blocks of container file 135, including the data blocks of active file system 110 and snapshots 125. To identify blocks for deduplication, the computing device sorts the tuples by fingerprint, where the occurrence of a fingerprint with multiple corresponding VVBNs indicates duplicative data blocks. The computing device sorts and orders the tuples for each fingerprint with multiple tuples to form chains of dependency pairs. The first donor block of the first pair is kept while donor blocks of subsequent pairs are identified as redundant. Dependencies of recipients in a chain are modified to reference the first donor block of the chain, and other blocks in the chain are released and may be overwritten.

Figure 3:
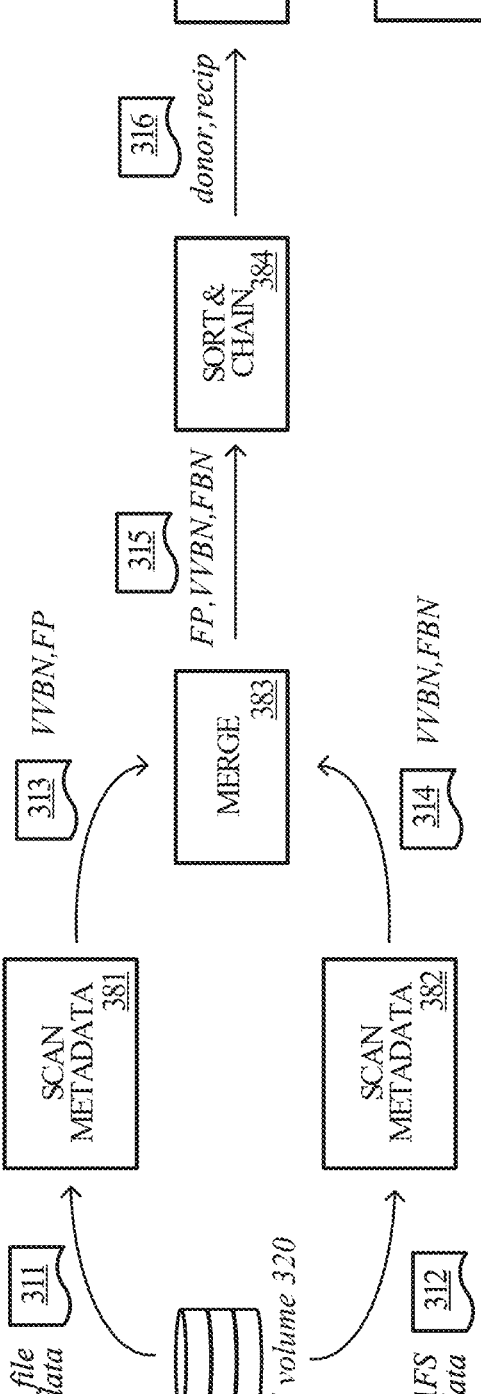
FIG. 3 illustrates a process for deduplication of data storage in an implementation.

Turning now to FIG. 3, FIG. 3 illustrates process 300 for deduplicating a storage environment in an implementation. Process 300 may be executed by a storage operating system such as storage operating system 160 of FIG. 1 which manages a storage environment hosting a WAFL file system implementing virtual volume 320. Virtual volume 320 is representative of an instantiation of an active file system (not shown) of files and directories. Virtual volume 320 may be defined according to a container file (not shown). The active file system is indexed by FBNs; the container file is indexed by VVBNs. Process 300 is executed by the storage operating system to identify duplicate blocks of the underlying physical storage of virtual volume 320 and to deduplicate the underlying storage.

In process 300, the storage operating system performs scan 381 of container file metadata 311 of virtual volume 320 generating metafile 313 including records of the VVBNs of the data blocks of the container file and fingerprints of the data blocks. The storage operating system also performs scan 382 of AFS metadata 312 of virtual volume 320 generating metafile 314 including records of the VVBNs of the active file system and inode values and FBNS of the data blocks.

The storage operating system executes merge 383 to merge metafiles 313 and 314 by VVBN. Merge 383 produces output 315 including tuples corresponding to the VVBNs detected by scans 381 and 382. The tuples correspond to either an AFS block or a snapshot block and include a VVBN attribute and a fingerprint attribute. The tuples of AFS blocks also include FBN values of the data blocks, and may also include inode values.

The storage operating system executes sort and chain 384 to sort, order, and chain the tuples of output 315. In an implementation, the storage operating system sorts the tuples by fingerprint and orders the tuples within each group of tuples based on the type of tuple (AFS or snapshot) and index value or other prioritization. Based on the sorting and ordering of sort and chain 384, the storage operating system identifies donor-recipient block sharing and generates output 316 which includes the donor-recipient pairs.

With the donor-recipient pairs identified, the storage operating system identifies the duplicate blocks of the underlying storage by VVBN and performs deduplication 385 to deduplicate the underlying storage, i.e., replace references to the duplicate blocks with references to a first or primary donor block and release the physical data block for other storage uses.

With deduplication 385 complete, the storage operating system performs compression 386 to compress the underlying physical storage. In an implementation, compression 386 includes a two-step compression process, compressing the AFS blocks of virtual volume 320 and compressing the snapshot blocks in a process of cross-volume block sharing.

Figure 4A:
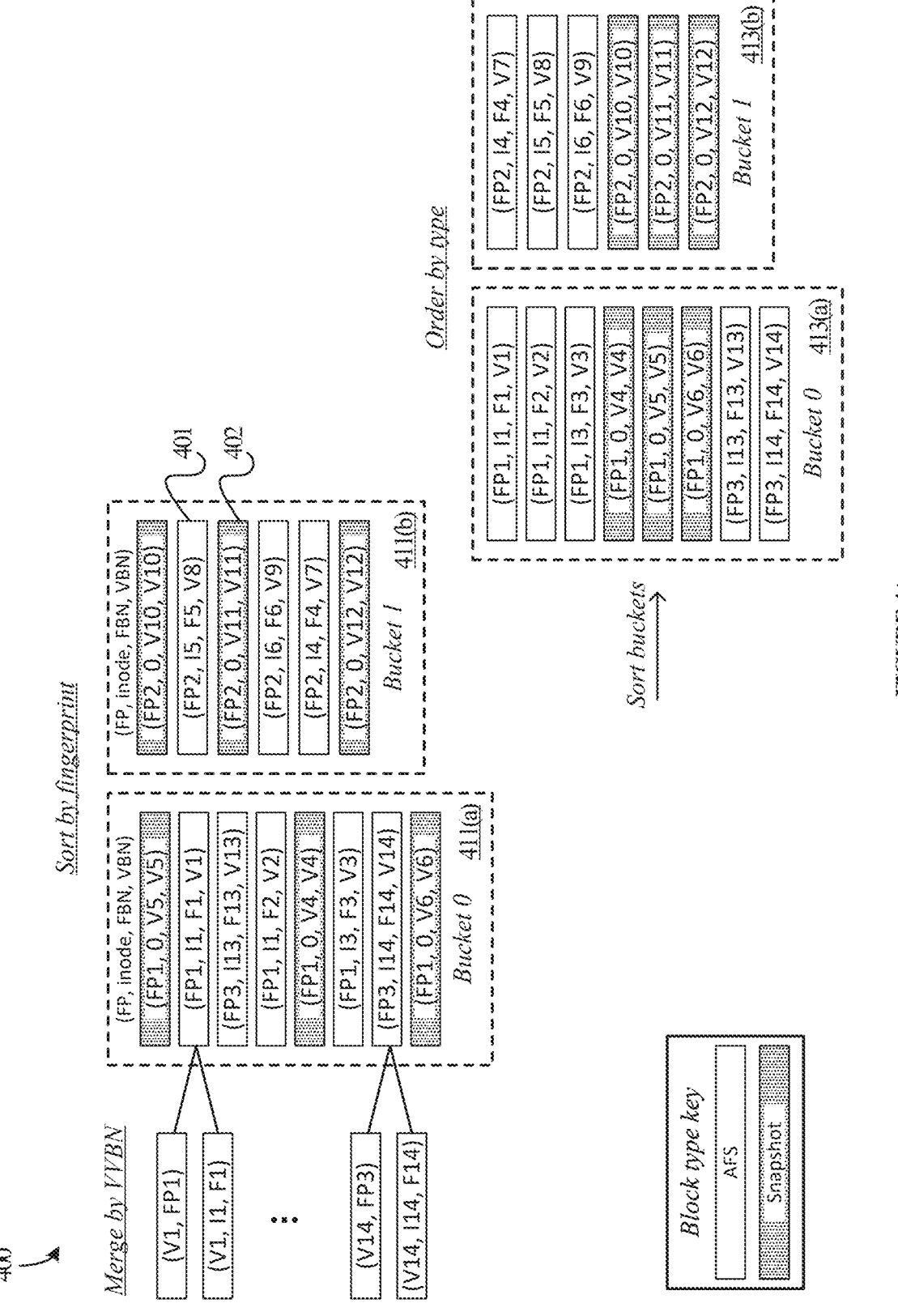
FIGS. 4A-4C illustrate a process for identifying duplicate data blocks for deduplication of data storage in an implementation.
Figure 4B:
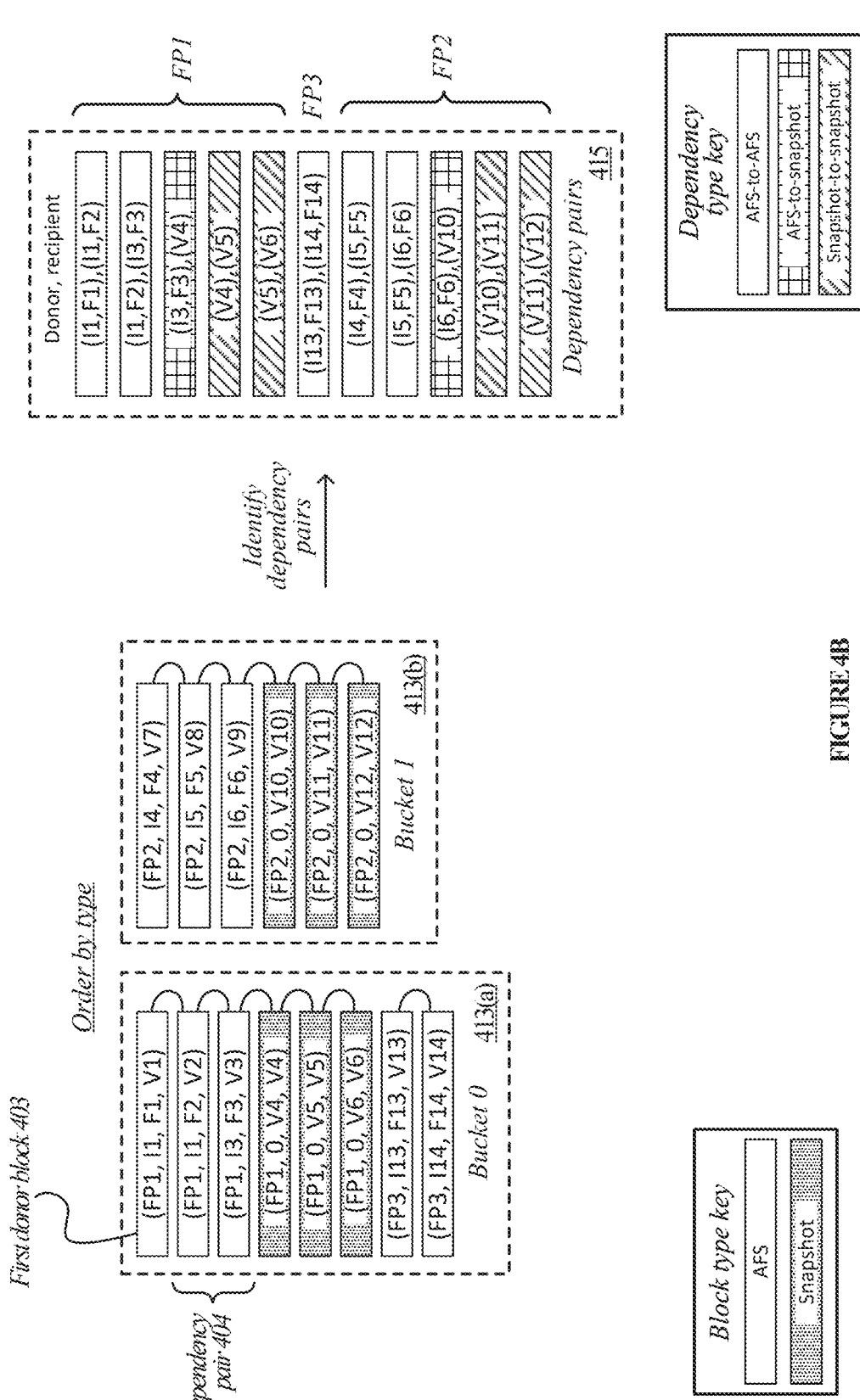
Figure 4C:
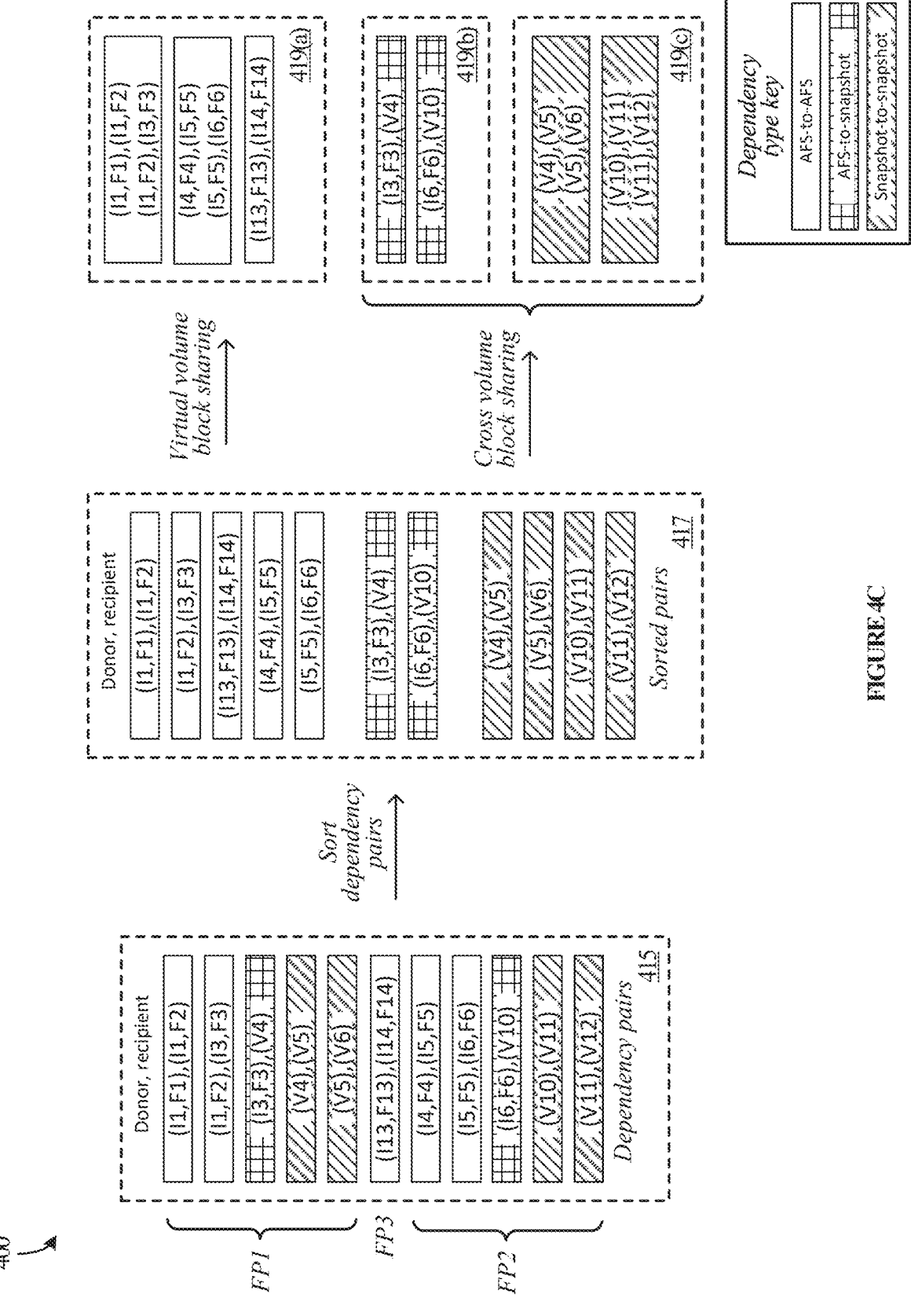

FIGS. 4A-4C illustrate process 400 for identifying duplicate blocks of storage environment in an implementation. Process 400 may be implemented by a storage operating system, such as storage operating system 160 of FIG. 1, to deduplicate data storage.

In FIG. 4A, a storage operating system has scanned block metadata of a data storage to generate log files of records associated with the blocks of data in the storage including blocks of data associated with an active file system of the data storage or with snapshots of the active file system. A first log file may be generated based on a scan of container file metadata to produce records of the VVBNs and fingerprints of each block of data of the one or more container files. The fingerprints may be read from an existing fingerprint database, or the storage operating system may compute fingerprints of data blocks not in the fingerprint database. A second log file may be generated based on scanning AFS metadata to produce records of the VVBNs and file system indexing, such as FBNs and inode values.

The storage operating system merges the first and second log files to generate tuples (of which tuples 401 and 402 are representative) which are then bucketized by fingerprint, as illustrated by buckets 411 (*a*) and 411 (*b*) of FIG. 4A. Tuple 401 illustrates a tuple created for an AFS block of data based on the merge operation, while tuple 402 illustrates a tuple created for a snapshot block of data based on the merge operation. Bucket 411 (*a*) illustrates a bucket of tuples associated with two particular fingerprints, fingerprints FP1 and FP3, while bucket 411 (*b*) illustrates a bucket of tuples associate with fingerprint FP2.

Continuing with process 400, the tuples of buckets 411 (*a*) and 411 (*b*) are ordered by (for each fingerprint) a type of data block to which the tuple is associated such that AFS blocks are followed by snapshot blocks. Further, the tuples are ordered within the block types by VVBN. The results of the ordering are illustrated as buckets 413 (*a*) and 413 (*b*). Each ordered set of tuples forms a dependency chain for each of the fingerprints.

In FIG. 4B, dependency pairs of donor and recipient blocks are identified based on the ordering of buckets 413 (*a*) and 413 (*b*). For example, for the six tuples of the tuple order of fingerprint FP1, the first tuple of the tuple order is identified as the first donor block for that fingerprint, e.g., first donor block 403, and five dependency pairs are identified, as illustrated by dependency pair 404. Further, based on the ordering of the tuples by type, three types of dependency pairs may be identified: AFS block to AFS block, AFS block to snapshot block, and snapshot block to snapshot block.

In FIG. 4C, the dependency pairs of dependency chains 415 are sorted by type, as illustrated by sorted pairs 417. At this point, duplicate blocks have been identified and deduplication can commence. Deduplicating the storage data may include updating the block metadata to according to a new block sharing scheme, e.g., updating the metadata to reference the first donor block and to dereference the duplicate blocks and releasing the duplicate blocks for other use. As illustrated in FIG. 4C, block sharing may occur within a virtual volume (e.g., block sharing 419 (*a*)) or across virtual volumes (e.g., block sharing 419 (*b*) and 419 (*c*)).

Figure 5:
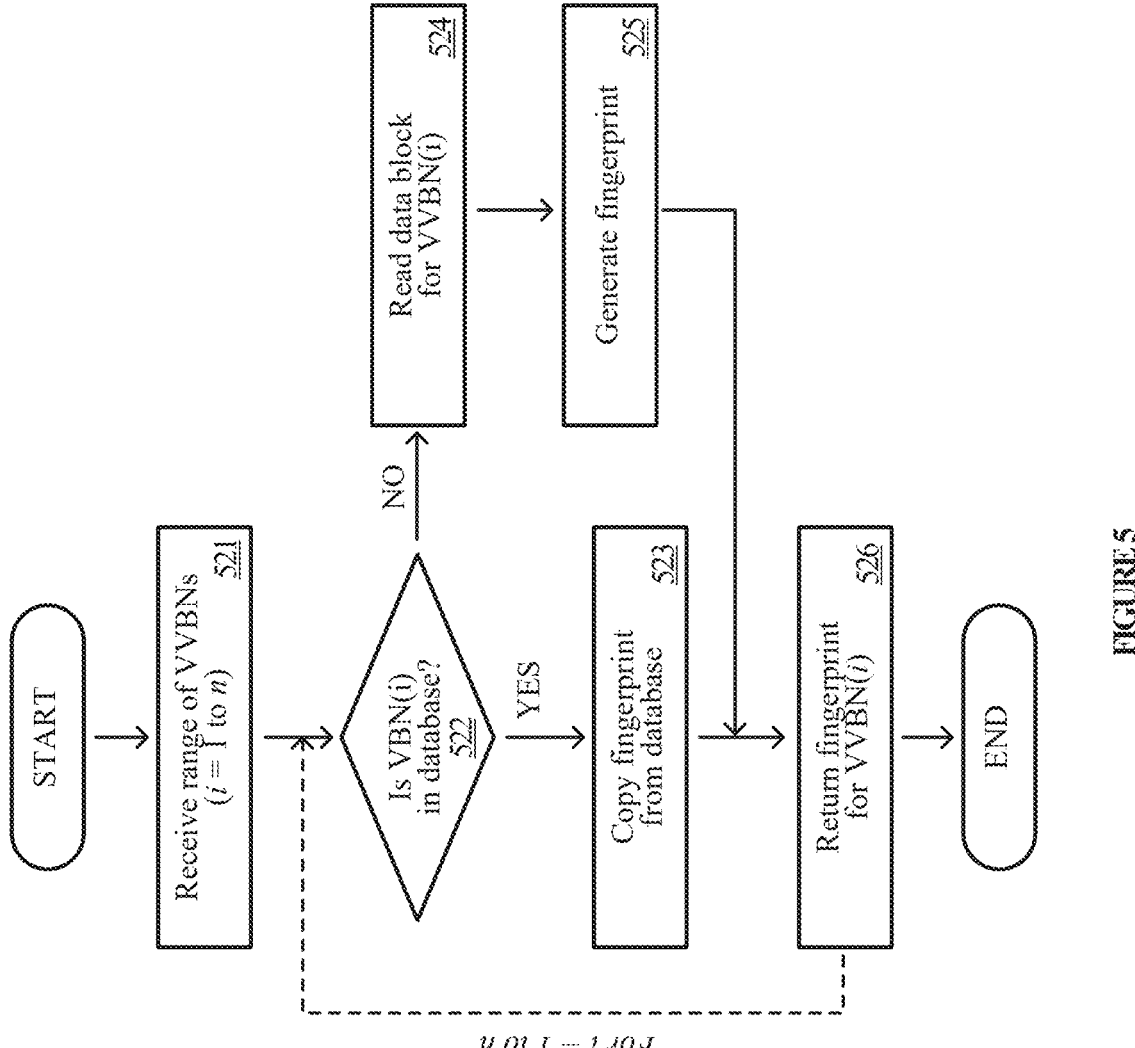
FIG. 5 illustrates a workflow for capturing block data fingerprints for deduplication of data storage in an implementation.

FIG. 5 illustrates workflow 500 for generating a log file of VVBNs correlated to block fingerprints for data blocks of a data storage system in an implementation. Workflow 500 may be executed by a storage operating system, such as storage operating system 160 of FIG. 1, in the context of deduplicating a storage system, for example, subsequent to a data migration to the storage system. Workflow 500 may also be implemented as scan 381 of process 300 in FIG. 3.

Workflow 500 commences with the storage operating system receiving a range of VVBNs (step 521). For a given VVBN in the range, the storage operating system consults a database of block data fingerprints to determine whether the database includes a fingerprint for the block of data of the VVBN (step 522). If the fingerprint is in the database, the storage operating system copies the fingerprint (step 523). If a fingerprint for the block is not in the database, the storage operating system reads the data of the data block from the storage system (step 524) and computes a fingerprint, such as a hash code) for the block (step 525). In either case, the storage operating system writes the VVBN and the corresponding fingerprint to a log file (step 526). Workflow 500 continues until all of the VVBNs in the range have been processed.

Figure 6:
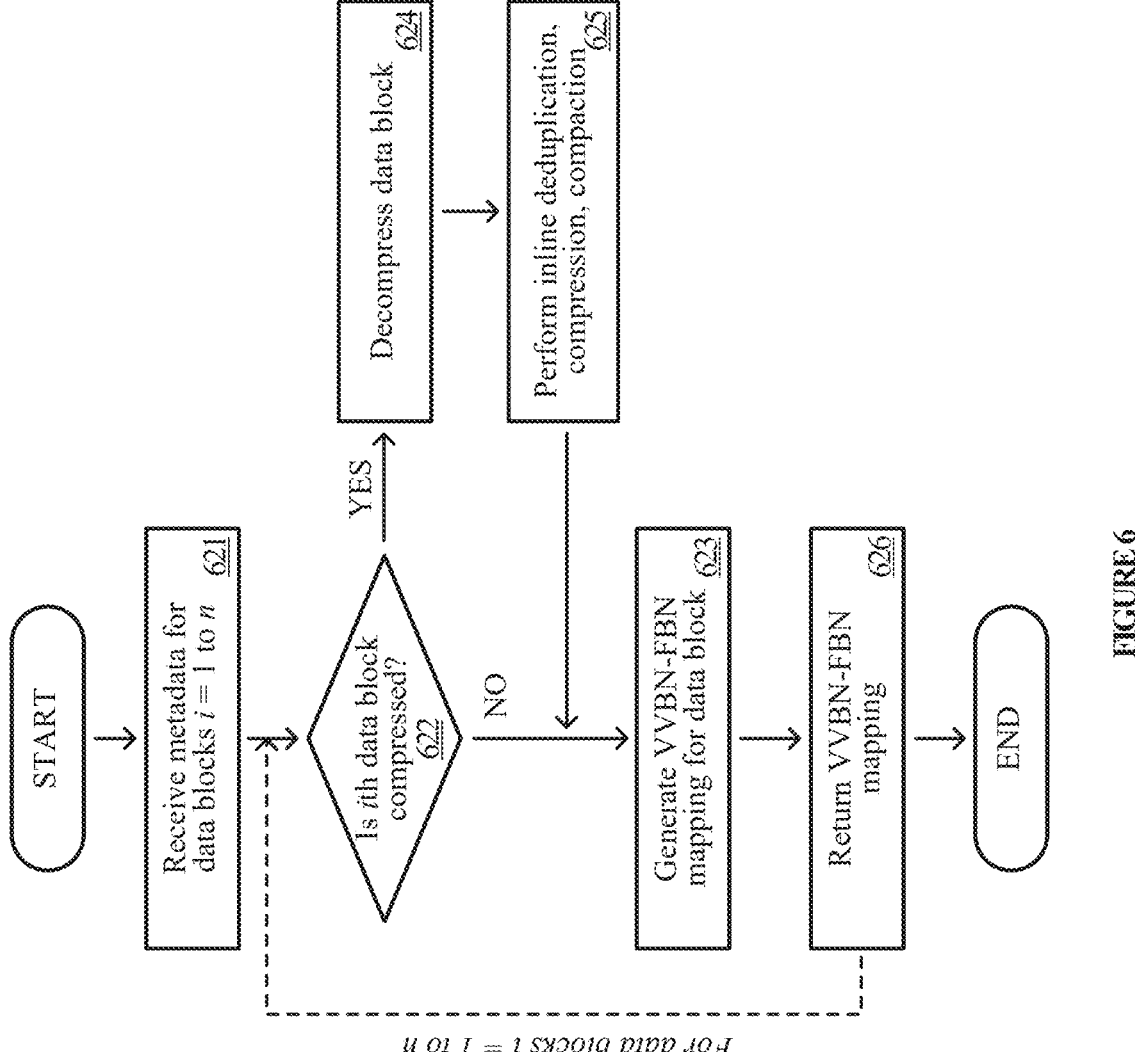
FIG. 6 illustrates a workflow for mapping block indexing of file system blocks for deduplication of data storage in an implementation.

FIG. 6 illustrates workflow 600 for mapping block index-ing of AFS blocks of a data storage system in an implementation. Workflow 600 may be executed by a storage operat-ing system, such as storage operating system 160 of FIG. 1, in the context of deduplicating a storage system, for example, after the migration of data to the storage system. Workflow 500 may also be implemented as scan 382 of process 300 in FIG. 3.

Workflow 600 commences with the storage operating system receiving metadata for a set of n data blocks of a data storage, such as an active file system of a logical volume of a data storage system (step 621). For each block in the set of blocks, the storage operating system determines whether the data of the block has been compressed (step 622). For example, the storage operating system may determine whether the block has been compressed according to the storage format of the storage from which the data was migrated. If the block data has not been compressed, the storage operating system generates a record including the VVBN along with the FBN (or FBN and inode value) of the block (step 623). Alternatively, if the block data has been compressed, the storage operating system executes an inline workflow including decompressing the block (step 624), then deduplicating, compressing, and compacting the block, then writing the block data to the storage system. Upon writing the block data to the storage system, the storage operating system generates a record which maps the block VVBN to the block FBN (or to the FBN and inode value) (step 623). Subsequent to generating the record for the block, the storage operating system writes the VVBN and the corresponding fingerprint to the log file (step 626). Workflow 600 continues until all of the data blocks in the set have been processed.

Figure 7:
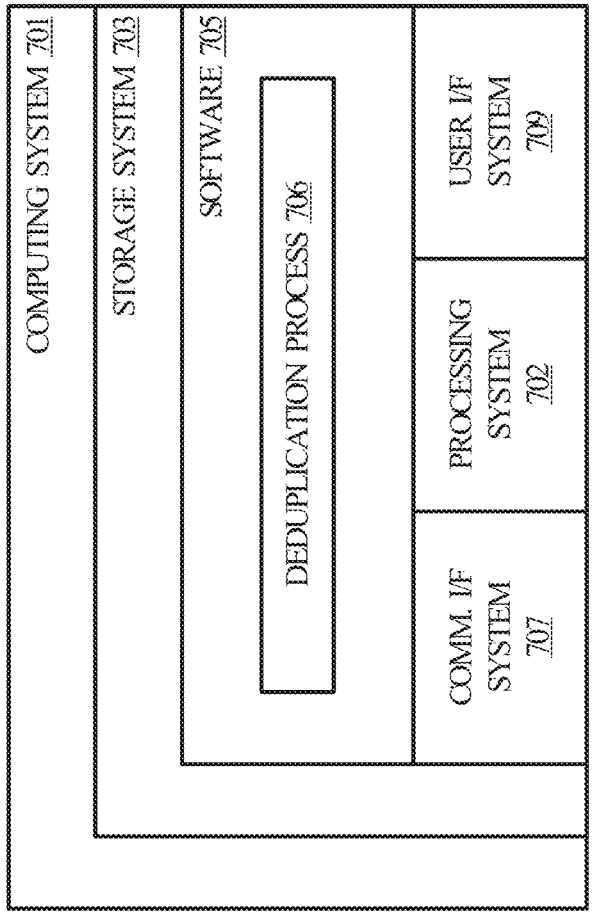
FIG. 7 illustrates a computing system suitable for implementing the various operational environments, architectures, processes, scenarios, and sequences discussed below with respect to the other Figures.

FIG. 7 illustrates computing device 701 that is represen-tative of any system or collection of systems in which the various processes, programs, services, and scenarios dis-closed herein may be implemented. Examples of computing device 701 include, but are not limited to, desktop and laptop computers, tablet computers, mobile computers, and wear-able devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and imple-ments deduplication process 706, which is (are) representa-tive of the deduplication processes discussed with respect to the preceding Figures, such as processes 200, 300, and 400 and workflows 500 and 600. When executed by processing system 702, software 705 directs processing system 702 to operate as described herein for at least the various processes, operational scenarios, and sequences discussed in the fore-going implementations. Computing device 701 may option-ally include additional devices, features, or functionality not discussed for purposes of brevity.

Referring still to FIG. 7, processing system 702 may comprise a micro-processor and other circuitry that retrieves and executes software 705 from storage system 703. Pro-cessing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including deduplication process 706) may be implemented in program instructions and among other functions may, when executed by processing system 702, direct processing system 702 to operate as described with respect to the various operational scenarios, sequences, and processes illustrated herein. For example, software 705 may include program instructions for implementing a deduplication process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support deduplication processes in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:

one or more computer readable storage media;

one or more processors operatively coupled with the one or more computer readable storage media; and program instructions stored on the one or more computer readable storage media that, when executed by the one or more processors, direct the computing apparatus to at least:

scan first metadata of blocks of a container file of a virtual volume to generate a first log file including records of virtual volume block numbers (VVBNs) and fingerprints of the blocks;

scan second metadata of blocks of an active file system of the virtual volume to generate a second log file including records of VVBNs and file block numbers (FBNs) of the blocks;

generate tuples based on merging the records of the first log file and the records of the second log file according to the VVBNs;

identify duplications among the blocks based on the tuples; and deduplicate the blocks based on the duplications in the active file system identified based on the tuples.

2. The computing apparatus of claim 1, wherein scan the first metadata of the blocks of the container file, the program instructions direct the computing apparatus to:

for a given VVBN in a range of VVBNs of the container file:

if the given VVBN is identified in an existing database of fingerprints, obtain a fingerprint associated with the given VVBN from the existing database; and if the given VVBN is not identified in the existing database of fingerprints, compute a fingerprint based on data of a block associated with the VVBN.

3. The computing apparatus of claim 1, wherein to scan the second metadata of the blocks of the active file system, the program instructions direct the computing apparatus to:

for a given block of the blocks of the active file system:

upon determining that data of the given block is compressed according to a format of a previous storage system:

decompress the data of the given block;

perform an inline deduplication, compression, and compaction of the data of the given block; and generate a record of the VVBN and FBN of the given block.

4. The computing apparatus of claim 1, wherein a tuple comprises a fingerprint attribute, an index node value, an FBN attribute, and a VVBN attribute of a block.

5. The computing apparatus of claim 4, wherein to identify the duplications among the blocks based on the tuples, the program instructions direct the computing apparatus to:

aggregate the tuples based on the fingerprint attributes to form groups;

order the tuples in each of the groups based on a block type of the tuples;

identify dependencies among the tuples; and identify the duplications based on the dependencies.

6. The computing apparatus of claim 5, wherein the block type comprises one of: snapshot block and active file system block.

7. The computing apparatus of claim 1, wherein to deduplicate the blocks based on the tuples, the program instructions direct the computing apparatus to, for a dependency of the dependencies, execute block sharing based on a type of the dependency.

8. The computing apparatus of claim 7, wherein a type of the dependency comprises one of: snapshot block to snapshot block and snapshot block to active file system block.

9. A method of operating a computing device comprising:

scanning first metadata of blocks of a container file of a virtual volume to generate a first log file including records of virtual volume block numbers (VVBNs) and fingerprints of the blocks;

scanning second metadata of blocks of an active file system of the virtual volume to generate a second log file including records of VVBNs and file block numbers (FBNs) of the blocks;

generating tuples based on merging the records of the first log file and the records of the second log file according to the VVBNs;

identifying duplications among the blocks based on the tuples; and deduplicating the blocks based on the duplications in the active file system identified based on the tuples.

10. The method of claim 9, wherein scanning the first metadata of the blocks of the container file comprises:

for a given VVBN in a range of VVBNs of the container file:

if the given VVBN is identified in an existing database of fingerprints, obtaining a fingerprint associated with the given VVBN from the existing database; and if the given VVBN is not identified in the existing database of fingerprints, computing a fingerprint based on data of a block associated with the VVBN.

11. The method of claim 9, wherein scanning the second metadata of the blocks of the active file system comprises:

for a given block of the blocks of the active file system:

upon determining that data of the given block is compressed according to a format of a previous storage system:

decompressing the data of the given block;

performing an inline deduplication, compression, and compaction of the data of the given block; and generating a record of the VVBN and FBN of the given block.

12. The method of claim 9, wherein a tuple comprises a fingerprint attribute, an index node value, an FBN attribute, and a VVBN attribute of a block.

13. The method of claim 12, wherein identifying the duplications among the blocks based on the tuples comprises:

aggregating the tuples based on the fingerprint attributes to form groups;

ordering the tuples in each of the groups based on a block type of the tuples;

identifying dependencies among the tuples; and identifying the duplications based on the dependencies.

14. The method of claim 13, wherein the block type comprises one of: snapshot block and active file system block.

15. The method of claim 9, wherein deduplicating the blocks based on the tuples comprises, for a dependency of the dependencies, executing block sharing based on a type of the dependency.

16. The method of claim 15, wherein a type of the dependency comprises one of: snapshot block to snapshot block and snapshot block to active file system block.

17. A method of operating a computing device, comprising:

scanning first metadata of blocks of a container file of a virtual volume to generate a first log file including records of virtual volume block numbers (VVBNs) and fingerprints of the blocks;

scanning second metadata of blocks of an active file system of the virtual volume to generate a second log file including records of VVBNs and file block numbers (FBNs) of the blocks;

generating tuples based on merging the records of the first log file and the records of the second log file according to the VVBNs;

aggregating the tuples based on fingerprint attributes of the tuples to form groups;

ordering the tuples in each of the groups based on a block type of the tuples; and identifying dependencies among the tuples.

18. The method of claim 17, wherein scanning the first metadata of the blocks of the container file comprises:

for a given VVBN in a range of VVBNs of the container file:

if the given VVBN is identified in an existing database of fingerprints, obtaining a fingerprint associated with the given VVBN from the existing database; and if the given VVBN is not identified in the existing database of fingerprints, computing a fingerprint based on data of a block associated with the VVBN.

19. The method of claim 17, wherein scanning the second metadata of the blocks of the active file system comprises:

for a given block of the blocks of the active file system:

upon determining that data of the given block is compressed according to a format of a previous storage system:

decompressing the data of the given block;

performing an inline deduplication, compression, and compaction of the data of the given block; and generating a record of the VVBN and FBN of the given block.

20. The method of claim 17, wherein a tuple comprises a fingerprint attribute, an index node value, an FBN attribute, and a VVBN attribute of a block.

* * * * *